US007490313B2

(12) United States Patent
Sinclair et al.

(10) Patent No.: US 7,490,313 B2
(45) Date of Patent: Feb. 10, 2009

(54) SYSTEM AND METHOD FOR MAKING USER INTERFACE ELEMENTS KNOWN TO AN APPLICATION AND USER

(75) Inventors: Robert E. Sinclair, Sammamish, WA (US); Patricia M. Wagoner, Redmond, WA (US); Heather S. Burns, Redmond, WA (US); Paul J. Reid, Woodinville, WA (US); Brendan McKeon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 10/440,519

(22) Filed: May 17, 2003

(65) Prior Publication Data

US 2004/0070612 A1 Apr. 15, 2004

Related U.S. Application Data

(60) Provisional application No. 60/414,863, filed on Sep. 30, 2002.

(51) Int. Cl.
*G06F 9/44* (2006.01)
*G06F 3/16* (2006.01)

(52) U.S. Cl. .................... 717/100; 715/727

(58) Field of Classification Search ............. 717/100, 717/104; 715/716, 726–727, 771
See application file for complete search history.

(56) References Cited

U.S. PATENT DOCUMENTS

| 5,764,241 | A | 6/1998 | Elliott et al. ............... 345/473 |
| 5,822,580 | A | 10/1998 | Leung ....................... 395/614 |
| 5,864,668 | A | 1/1999 | Andert et al. ........... 395/200.33 |
| 5,898,434 | A * | 4/1999 | Small et al. ................. 715/810 |
| 5,912,666 | A | 6/1999 | Watson et al. ............... 345/339 |
| 6,031,531 | A * | 2/2000 | Kimble ....................... 715/862 |
| 6,146,027 | A | 11/2000 | Orton et al. ................. 395/683 |
| 6,272,521 | B1 | 8/2001 | Jablonski et al. ............ 709/200 |
| 6,801,231 | B1 * | 10/2004 | Beltz ........................... 715/865 |
| 6,981,246 | B2 * | 12/2005 | Dunn .......................... 717/127 |
| 7,020,701 | B1 * | 3/2006 | Gelvin et al. ............... 709/224 |
| 7,137,100 | B2 * | 11/2006 | Iborra et al. ................ 717/106 |
| 7,188,335 | B1 * | 3/2007 | Darr et al. ................... 717/121 |
| 7,383,536 | B1 * | 6/2008 | Petry et al. .................. 717/125 |
| 2002/0174147 | A1 * | 11/2002 | Wang et al. ................. 707/513 |
| 2002/0178007 | A1 * | 11/2002 | Slotznick et al. ......... 704/270.1 |
| 2002/0194219 | A1 * | 12/2002 | Bradley et al. ............. 707/506 |

(Continued)

OTHER PUBLICATIONS

Angel R. Puerta et al, "Mobile: User-Centered Interface Building" May 1999, CHI 99 15-20, ACM Press, p. 426-433.*

(Continued)

*Primary Examiner*—Wei Y Zhen
*Assistant Examiner*—Anna Deng
(74) *Attorney, Agent, or Firm*—Merchant & Gould, PC.

(57) ABSTRACT

Control patterns are used to describe functionality that may be exposed by one or more types of elements or controls. Functionality that is common among two or more types of elements is described by the same control pattern. Certain predefined methods, structures, properties, and/or events may be associated with a particular control pattern. Elements that support the control pattern, when queried, return an interface that describes those methods, structures, properties, and/or events. Control patterns are mutually exclusive in the functionality they represent, so they may be combined in arbitrary ways to expose the complete set of functionality offered by a particular control.

15 Claims, 6 Drawing Sheets

U.S. PATENT DOCUMENTS

| | | | |
|---|---|---|---|
| 2003/0046082 A1* | 3/2003 | Siegel | 704/270 |
| 2003/0058267 A1* | 3/2003 | Warren | 345/705 |
| 2004/0036715 A1* | 2/2004 | Warren | 345/713 |
| 2004/0095371 A1* | 5/2004 | Haynes et al. | 345/711 |
| 2004/0148419 A1* | 7/2004 | Chen et al. | 709/231 |
| 2004/0268267 A1* | 12/2004 | Moravcsik | 715/821 |
| 2005/0015780 A1* | 1/2005 | McKeon et al. | 719/328 |
| 2005/0093846 A1* | 5/2005 | Marcus et al. | 345/184 |
| 2005/0102636 A1* | 5/2005 | McKeon et al. | 715/854 |
| 2005/0114361 A1* | 5/2005 | Roberts et al. | 707/100 |
| 2005/0257164 A1* | 11/2005 | Iwamura | 715/771 |

OTHER PUBLICATIONS

Huan Chao Keh, et al, "Direct-Manipulation User Interface Modeling with High-Level Petri Nets", Apr. 1991, ACM Press.*

Brad A. Myers, "User Interface Software Tools", Mar. 1995, ACM Press vol. 2, Issue 1.*

Steriadis et al. "Designing human-computer interfaces for quadriplegic people", Jun. 2003, ACM, TOCHI vol. 10, Issue 2, pp. 87-118.*

Hornbaek et al. "Navigation patterns and usability of zoomable user interfaces with and without an overview" Dec. 2002, ACM, TOCHI vol. 9, Issue 4, pp. 362-389.*

* cited by examiner

SYSTEM AND METHOD FOR MAKING USER INTERFACE ELEMENTS KNOWN TO AN APPLICATION AND USER

REFERENCE TO RELATED APPLICATIONS

The present patent application claims priority from copending U.S. Provisional Patent application No. 60/414,863, entitled System and Method for Making User Interface Elements known to an Application and User, filed on Sep. 30, 2002, and in the names of Brendan McKeon, Paul Reid and Robert Sinclair.

FIELD OF THE INVENTION

The present invention relates to computer software, and more particularly, to user interface accessibility features of computer software.

BACKGROUND OF THE INVENTION

Some individuals may not be able to interact with a computer user interface the way it is commonly used. For instance, small icons and type pose a challenge for the visually impaired. Audible alerts and feedback are useless to the hearing impaired. The computing industry is sensitive to these needs. Some operating systems come with additional accessibility features that enable those with disabilities to modify the user interface in ways that are more accommodating to their needs. For instance, some operating systems allow users to enable visual feedback where audible feedback would otherwise be used. In addition, extra large screen fonts and high contrast schemes may used for users with low vision. For those with extreme visual impairments, such as the blind, some operating systems provide "screen readers" that narrate the elements of the user interface to the user or provide infrastructure allowing another company to provide such a screen reader.

A typical screen reader utility executes concurrently with whatever application the user may be working with. As the user navigates from element to element, such as by tabbing from one button to another, the screen reader sends information about the current element to a text-to-speech engine and/or a refreshable Braille display to convey that information to the user. Text-to-speech engines translate this information into synthesized speech to announce it to the user. Refreshable Braille displays translate that information into a well-defined pattern of dots (i.e., Braille characters) and raise pins on a physical hardware device corresponding to each dot in the Braille characters. In the case of a button, the screen reader often conveys the name of the button and the current state of that button (e.g., it is currently disabled and therefore cannot be pressed). Similarly, if a user is in a word processing application, the screen reader can be configured to identify the foreground window (i.e., name of the application) and the current line, sentence, word, or character closest to the insertion point. The screen reader can also describe attributes of that text, such as the font name, weight, color, emphasis, and justification. Often times, the screen reader also informs the user what actions the user may currently take. For instance, if the user has navigated to a button, the screen reader may notify the user that they may press the button by tapping the space bar.

Screen readers are indispensable for computer users with certain visual impairments. In general, many users would simply not be able to take advantage of a computer without an assistive technology product that compensates for their loss of mobility, sensory perception, or other facilities that can be enhanced through technology. However, current software design methodologies make assistive technology products, such as screen readers, difficult to design. As mentioned, the assistive technology product typically receives a notification of a change to a currently-running application or the operating system environment itself. Often this notification takes the form of an event indicating that focus has changed from one element (e.g., a button or list box) to another element (e.g., an edit field, icon, or the like) or that a new element has been created or destroyed (e.g., a window has been opened or closed). A selection manager associated with the application raises the event and notifies the operating system of the change. In response, the assistive technology product may query the selection manager to determine what element is associated with the event (e.g., which element has the focus) so it may obtain additional information to convey to the user.

Currently, assistive technology products essentially are only able to request from the element a limited set of information such as its type (e.g., button, list box, or the like), its location on the screen, or its caption. The assistive technology product itself must then deduce from the returned element type what functionality is available to the user. In other words, the assistive technology product must understand what a "button" is and that the button may be pressed (invoked). Therefore, the designers of a good assistive technology product must predefine all of the types of elements that might be included in an application and identify their functionality. This is an impossible task because there are new types of screen elements or controls produced on a routine basis by software companies throughout the software industry. In addition, this is an inefficient use of resources because not all elements are unique. Many elements share similar functionality, such as the ability to be invoked or the ability to manage a collection of items where one or more items may be selected.

A more general class of applications, automation utilities, has nearly the same set of requirements as these assistive technology products. In general, automation utilities need the ability to dynamically discover screen elements (e.g., controls) whether by traversing the object hierarchy of elements or by receiving an event notification, such as when the focus changes from one control to another. These utilities also need a general mechanism for querying these elements for human-readable information that can be conveyed to the user or stored for later reference. Finally, automation utilities need the ability to discover what functionality or behavior is offered by a particular screen element, even when the element is completely unknown to the automation utility. Unfortunately, a superior mechanism for discovering elements of a user interface and querying and manipulating their associated functionality in such a way that it can be applied to the full spectrum of possible elements has eluded those skilled in the art.

SUMMARY OF THE INVENTION

The present invention is directed at making functionality of a user interface element (or control) programmatically available to an application without having prior knowledge of the element's type. In addition, the present invention is directed at a mechanism for providing software developers control over the information that may be conveyed to a user using an automation utility, such as an assistive technology product (e.g., a screen reader for the blind). Briefly stated, control patterns are used to describe functionality that may be exposed by one or more types of elements. Functionality that is common among two or more types of elements is described by the same control pattern. Certain predefined methods, structures, properties, and/or events may be associated with a particular control pattern. Elements that support the control pattern, when queried, return an interface that describes those methods, structures, properties, and/or events. In this way, an automation utility may manipulate an element without having prior knowledge of the functionality supported by the element, so long as the element is able to confirm that it supports a particular control pattern or set of control patterns.

In another aspect, a plurality of properties are included with each element that defines, in human-readable form, a set of information that may be useful to the automation utility or a user of the utility. In this way, software developers have greater control over exactly what information may be gathered and presented to the user when an element is described, thereby improving the user experience.

DETAILED DESCRIPTION OF THE PREFERRED EMBODIMENT

The invention provides a mechanism that enables an automation utility, such as an assistive technology product, automated testing script, macro recorder, or commanding application, to gather descriptive information about a user interface element and to determine what functionality that element provides without knowing exactly what type of element it is. Briefly stated, the inventors have determined that each element or control includes two aspects of interest to the automation utility: (1) the information that describes its appearance, location, and current state, and (2) the functionality that the element exposes. In view of this determination, the invention involves assigning a plurality of properties to an element that includes a description of what the element is in such a fashion that it may be communicated to a user (e.g., human readable form). The invention further involves identifying groups of functionality that may be made available by the element and which can be accessed directly without discovering exactly what the element is.

The invention will be described here first with reference to one example of an illustrative computing environment in which embodiments of the invention can be implemented. Next, a detailed example of one specific implementation of the invention will be described. Alternative implementations may also be included with respect to certain details of the specific implementation. It will be appreciated that embodiments of the invention are not limited to those described here.

Illustrative Computing Environment of the Invention

Figure 1:
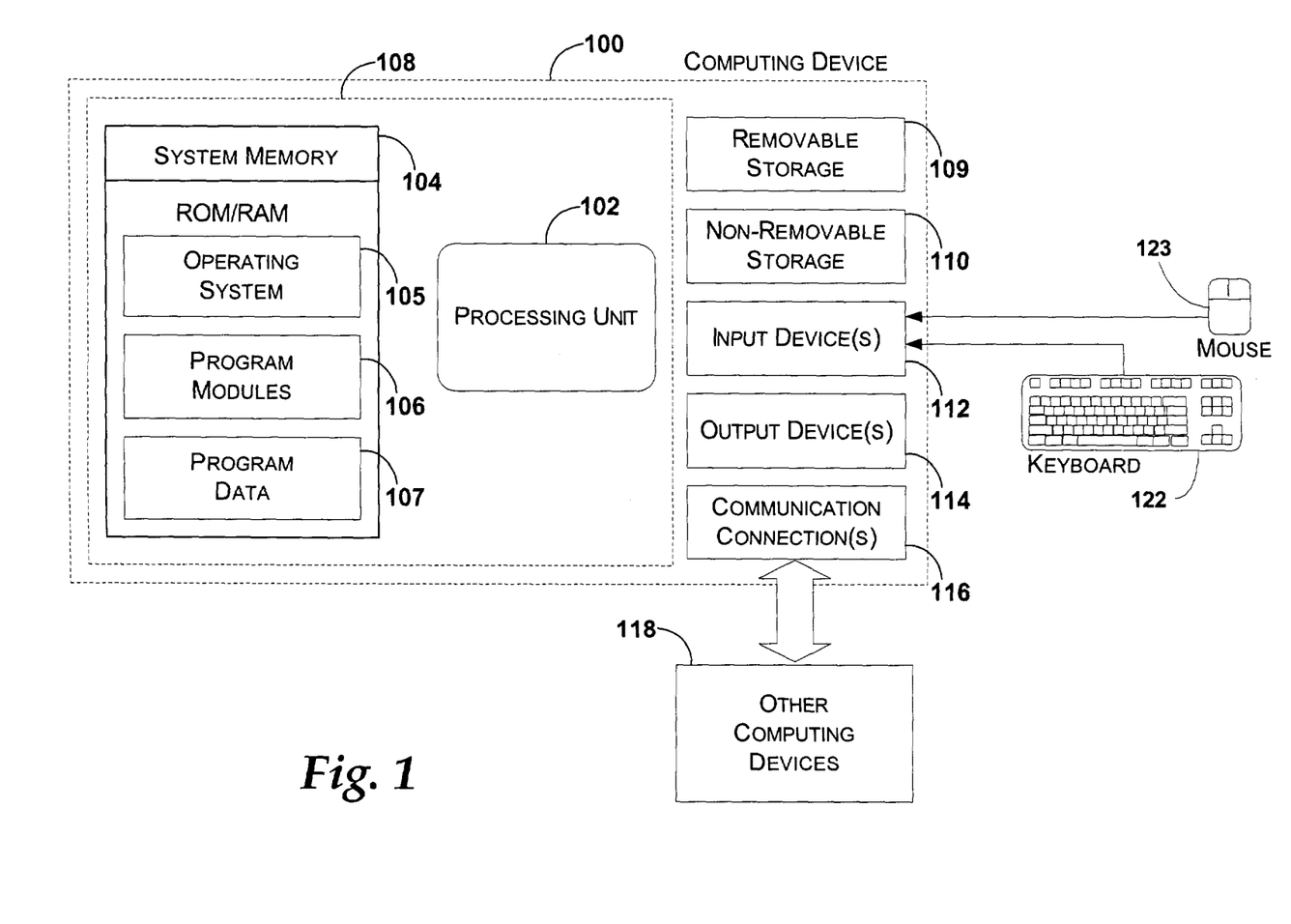
FIG. 1 is a functional block diagram that illustrates a computing device that may be used in implementations of the present invention.

FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 101. Computing device 100 may also have input device(s) 112 such as keyboard 122, mouse 123, pen, voice input device, touch input device, scanner, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation of the Invention

Figure 2:
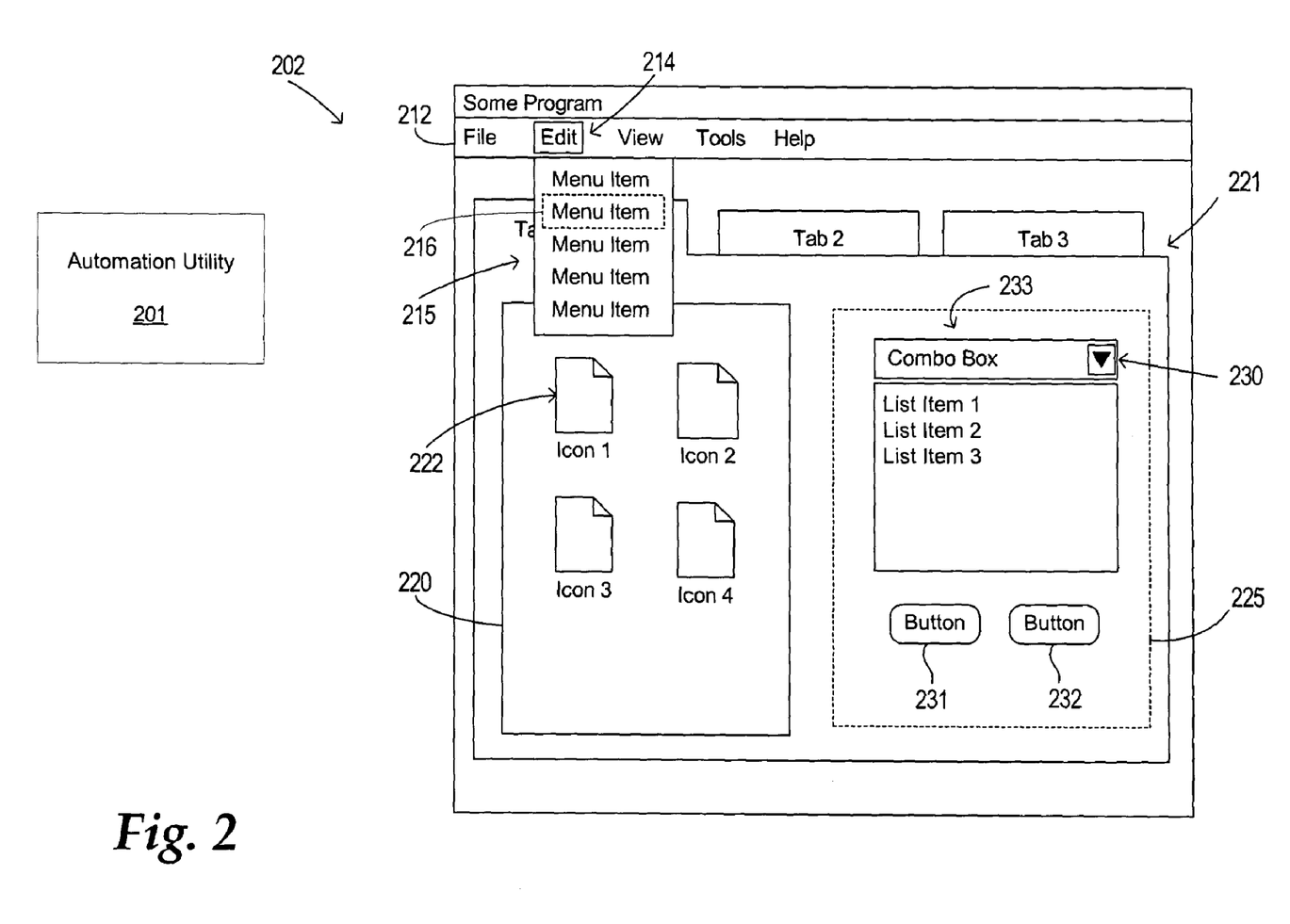
FIG. 2 is a functional block diagram generally illustrating a screen display of a system implementing the present invention.

FIG. 2 is a functional block diagram generally illustrating components of one system implementing the present invention. Illustrated in FIG. 2 are an automation utility (e.g., an assistive technology product) 201 and an application 202. The application 202 includes multiple elements. For the purpose of this discussion, the term element means any component of the user interface with which a user can interact or that provides some meaningful information to the user or functionality to the application 202. The term control is also used sometimes to identify such elements. The user can interact with many of the elements illustrated in application 202. For example, the application 202 includes a menu bar 212 with multiple menus, each menu having an associated series of menu items. An edit menu 214 includes a drop-down menu list with multiple menu items 215.

Some elements are included within other elements. For example, a list view 220 includes some icons, such as icon 222. A frame 225 contains a combo box 230 and two buttons, button 231 and button 232. In addition, both the frame 225 and the list view 220 are contained on a tabbed dialog element 221. In common computer terminology, each element that is contained within another element is considered a child of that containing element. Thus, the combo box 230 is a child of the frame 225. The frame 225 and the list box 220 are children of the tabbed dialog element 221.

A user may navigate from one element to another in several ways. One way is to maneuver a mouse pointer from one element to another element. Another way may be to press a tab key or a directional-arrow key. The element to which a user has navigated, the "currently-active" element, is considered to have "focus." For instance, as illustrated in FIG. 2, menu item 216 is selected and currently has focus. As the user navigates from one element to another element, the automation utility 201 can be notified automatically of the element which has gained focus. In the case where the automation utility 201 is a screen reader, it retrieves the name or label of the newly focused element and "speaks" that information to the user. The screen reader may read the title of the active window, menu options, the text that is typed, and the like. actuality, the screen reader gathers textual information and then passes it to a text-to-speech engine that converts that text into synthesized speech output. Although described here as a screen reader, it will be appreciated that the automation utility may be any of a number of different types of utilities, such as speech and dictation software, command and control utilities, macro recorders, automated test script, commanding utility, or the like.

As described above, in the past, the automation utility 201 would have simply determined the type of element currently having focus and used its control type (e.g., button, menu item, editable text field, or the like) to extract control-specific information to be conveyed to the user. As will be described in greater detail shortly, in accordance with the invention, the elements are configured to include a plurality of common and special properties that collectively describe that element and can be used by an automation utility 201 to supplement the user's experience. By exposing information about an element through these properties, developers have greater control over defining what information will be conveyed to the user when using an automation utility 201 that utilizes the present invention. In other words, rather then being limited to type-based information associated with on-screen elements, the automation utility 201 can be made to convey any human-readable string of information for a particular element and describe the behavior or purpose of that element to the user.

Many of the elements are interactive and present functionality that causes the application 202 to perform in its intended manner. For instance, clicking button 231 likely results in some reaction by the application 202. Clicking button 232 likely results in some other reaction by the application 202. Selecting menu item 216 likely results in still some other reaction.

Although each of the elements may be slightly different, many expose similar basic functional characteristics. Those basic functional characteristics relate to the behavior of the element itself, as opposed to the particular reaction that may occur by the application 202. In other words, button 231 and button 232 are both clickable, even though the application 202 may react in different ways depending on which button was clicked. Likewise, the menu items 215 and items within the combo box 230 are selectable. In contrast, most of the different types of elements also have some basic functionality that is different. For instance, the combo box 230 allows text to be edited within an edit box portion 233 while the menu items 215 do not provide the ability to edit their content.

The inventors have determined certain patterns of basic functionality that are present in many different types of elements. This determination has enabled "control patterns" to be established to describe basic functionality that may be exposed by an element. A control pattern is a mechanism for describing the behavior of an element. More specifically, a particular control pattern may define certain structure, properties, events, and methods supported by an element. Elements may (and likely do) support multiple control patterns. The collection of control patterns supported by an element defines the totality of the element's behavior.

An application can query whether the element supports a particular control pattern to determine the element's behavior. Thus, without having prior knowledge of a particular element's type, a client application can discover the functionality available for that element by querying whether it supports a particular control pattern. The application may then programmatically manipulate the element through common interfaces associated with that control pattern. New elements may be created with slightly or drastically different behavior, yet applications could still interact with the new elements by querying for the control patterns that the new elements support. The following table represents some illustrative control patterns and the set of behaviors associated with that control pattern:

TABLE 1

Description of Illustrative Control Patterns

| Name | Description |
| --- | --- |
| ApplicationWindow | Exposes the behavior and information typically associated with a top-level application window |
| Commands | Exposes the set of actions that can be performed by the user ("save" a document, "press" a button, etc.) |
| DescriptiveInformation | Exposes semantic information for UI elements, especially those which represent other objects (e.g., a list item in a mail program could use this pattern to indicate that it represents an e-mail message and can expose information about its importance, whether it's read or unread, etc.) |
| Dock | Expose an element's ability to change its docking state at run |
| ExpandCollapse | Exposes a control's ability to expand to display more content or collapse to hide content |
| Grid | Exposes basic grid functionality, size and moving to specified cells |
| GridItem | Used to expose the elements of a Grid |
| HierarchyItem | Expose and allow clients to traverse the hierarchal relationship between UI elements independent from their relationship in the logical tree. Hierarchy relationships are defined to be non-circular |
| Invoke | Exposed the ability of an element to be activated or invoked. For example, a button supports this pattern to allow an automation utility to |

TABLE 1-continued

Description of Illustrative Control Patterns

| Name | Description |
| --- | --- |
| | programmatically press the button. |
| Multimedia | Exposes the ability of an element to present multimedia content, including multiple streams of data in a synchronized manner: closed captions, descriptive audio, ASL stream, alternative languages, etc. |
| MultipleView | Exposes an element's ability to switch between multiple representations of the same set of information, data, or children |
| RangeValue | Exposes a related set of properties that reflect a control's ability to manage a value within a finite range. It conveys a control's valid mm and max values and its current value |
| Scroll | Exposes a control's ability to change the portion of its content that is visible to the user |
| Selection | Exposes the items within a container's collection of children which are currently selected. |
| SelectionItem | Defines a selectable item in a container and allows that item's selection to be manipulated directly |
| Sort | Expose a container's current sort order and allow clients to programmatically resort its elements |
| Split | Exposes the ability to divide an element's content area into multiple panes or interactive areas |
| Table | Used in conjunction with the Grid pattern to indicate that the Grid also has header information |
| TableItem | Represents a cell in a table; used to simplify the client's view of a table |
| Text | Exposes the behavior and functionality associated with editing, formatting, and interpreting large blocks of text |
| Value | Used to get and set values for controls that do not span a range |
| VisualInformation | Used to provide a description of the visual appearance of an image, element, animation, control, etc. that provides valuable information to the user |
| Window | Expose an element's ability to change its on-screen position or size, including being maximized, minimized, and fullscreen |
| Zoom | Exposes the a control's (e.g., a document viewer) ability to change its zoom level |

Thus, the elements illustrated in FIG. 2 can be configured with the appropriate control patterns to represent the type of behavior that may be expected of the particular type of element. What follows is a table that describes some common elements and some control patterns that may be used to define the behavior of those common elements:

TABLE 2

Control Patterns for Common Elements

| Element | Relevant Control Patterns |
| --- | --- |
| Button | Commands, Invoke, VisualInformation (if appropriate) |
| Combo box | ExpandCollapse, Selection, Text, Value |
| List box | Selection, Scroll, DragAndDrop (if appropriate) |
| List view | Selection, Scroll, Sort, Grid (in some views), MultipleView, Table, DragAndDrop (if appropriate) |
| Text box, Edit | Commands, DragAndDrop, Scroll (if appropriate), Text, Zoom (if appropriate) |

Figure 3:
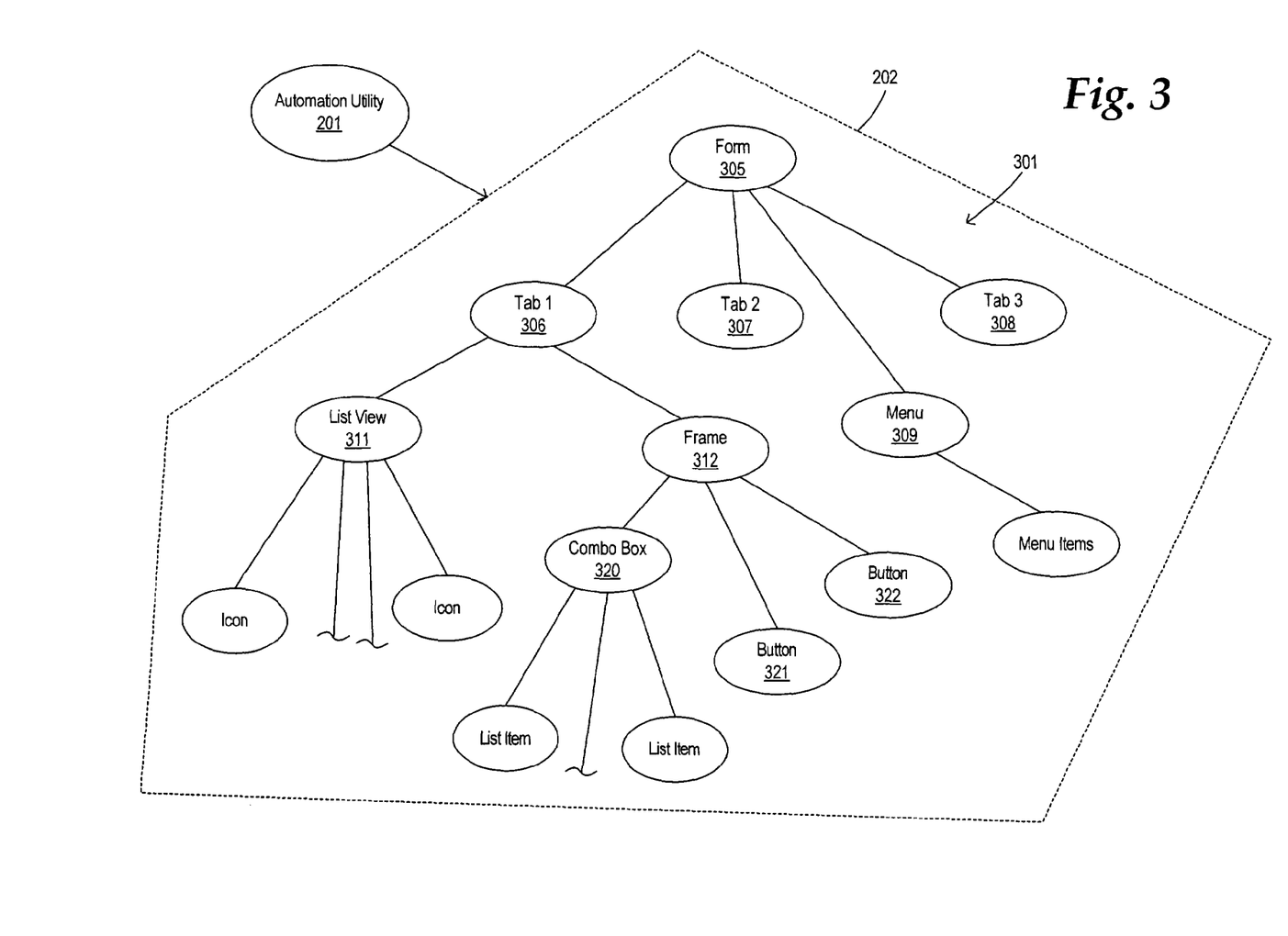
FIG. 3 is a graphical representation of an object tree that represents the elements shown in the screen display of FIG. 2.

FIG. 3 is a graphical illustration of an object tree 301 that represents the elements of the application 202 shown in FIG. 2. It should be appreciated that one or more objects in the object tree 301 may be a proxy or wrapper object that represents a corresponding element of the application 202. However, for the purpose of simplicity only, this discussion will treat each object in the object tree 301 as the actual element. The main application window is represented as form object 305, and each element of the application 202 includes a corresponding object in the object tree 301. For instance, each portion of the tabbed dialog 221 in FIG. 2 has a corresponding tab item (tab 306, tab 307, tab 308) in the object tree 301. Similarly, the list view 220 and frame 225 have corresponding objects (list view 311 and frame 312) in the object tree 301. The parent/child relationships are also represented in the object tree 301. For instance, the frame object 312 has child objects (combo box 230, button 321, and button 322) that correspond to the elements contained within the frame 225.

In operation, as the user navigates from one element to another in the application, a selection manager associated with the application 202 notifies the automation utility 201 (illustrated in FIG. 3 as an object) that the focus has changed. In the case of a screen reader, this focus change may cause the automation utility 201 to query the particular object representing the current element with focus for a plurality of properties and for the control patterns supported by that element. A change in the focus is only one of many possible reasons that an automation utility may choose to query an element for this information.

Figure 4:
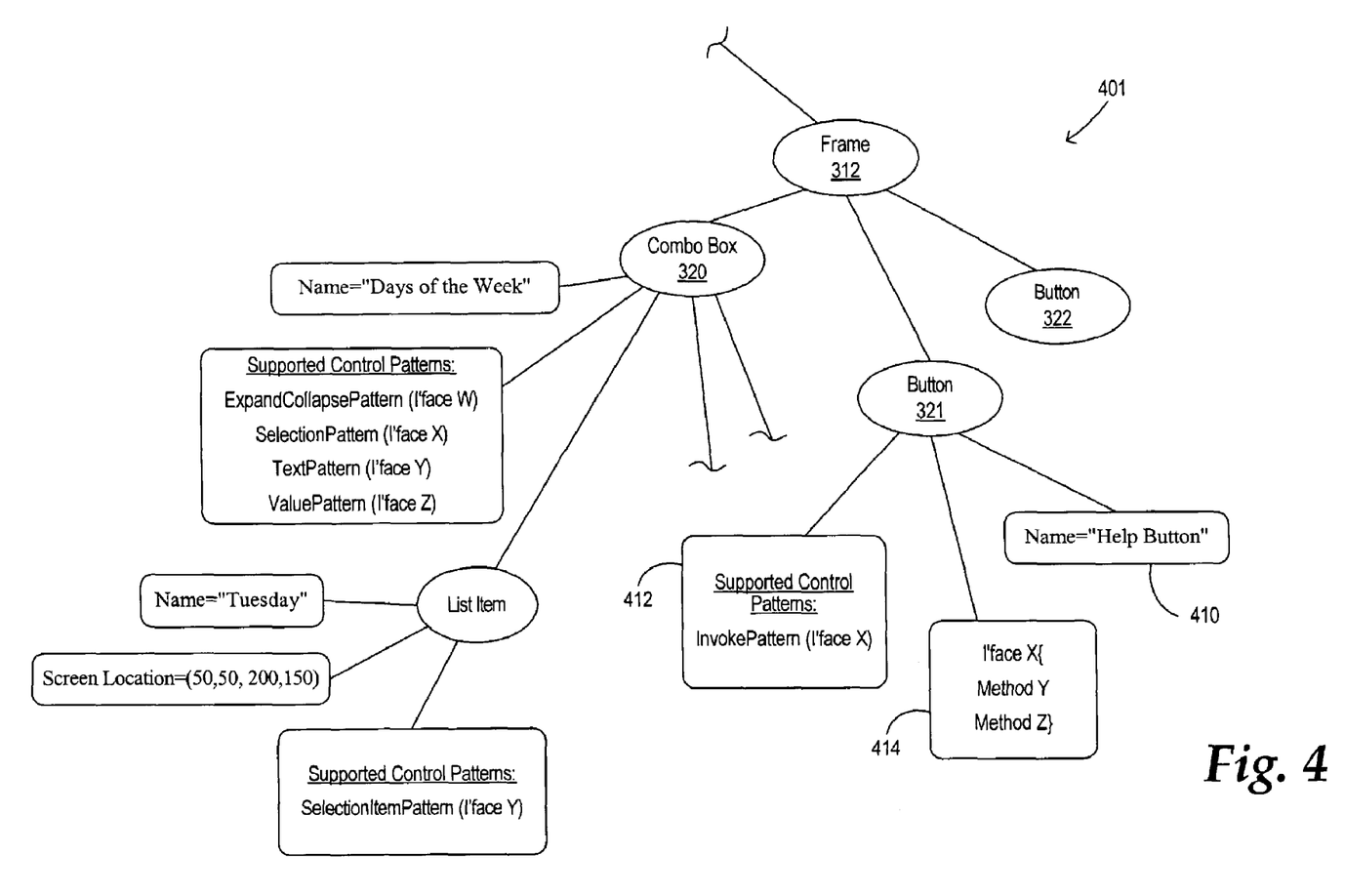
FIG. 4 is a graphical representation of a sub-tree of the object tree shown in FIG. 3.

A sub-tree 401 of the object tree 301 is illustrated in FIG. 4. To further illustrate the operation, assume the automation utility 201 is a screen reader. As the user navigates to the button 231, the screen reader may query its corresponding object (button 321) and retrieve its Name property 410, a human readable string, for narration to the user. The Name property 410 contains the string that would be associated with that control by a sighted user looking at the computer display. In this case, the screen reader sends the string "Help Button" to the text-to-speech engine which then narrates that information to the user.

In addition, the automation utility 201 may query the button 321 to identify the control patterns 412 supported by its corresponding element. In this case, one identified control pattern for the button 321 is the "Invoke" control pattern. The control patterns not only allow a client application to query an element's behavior, they also allow it to programmatically manipulate the element via interfaces designed for that particular control pattern. In this example, the automation utility 201 may query the button 321 directly to determine whether it supports the Invoke control pattern. The button 321 may indicate an affirmative response by returning an interface (Interface X 414) that includes a set of methods for taking advantage of the invoke behavior. In another example, a Selection control pattern (associated with the combo box 320) may provide methods to query for selected items, select or deselect a specific item, determine if the element supports single or multiple selection modes, and the like.

Through the mechanisms enabled by the present invention, automation utilities can be written that understand how to work with each control pattern, instead of each UI element or control. Since the discrete types of behaviors that elements will display are relatively few, there will be far fewer control patterns than there are types of elements or controls. This results in less code to write for an automation utility, and it encourages a more flexible architecture for automation utilities that can effectively interrogate and manipulate new elements that support known control patterns.

Figure 5:
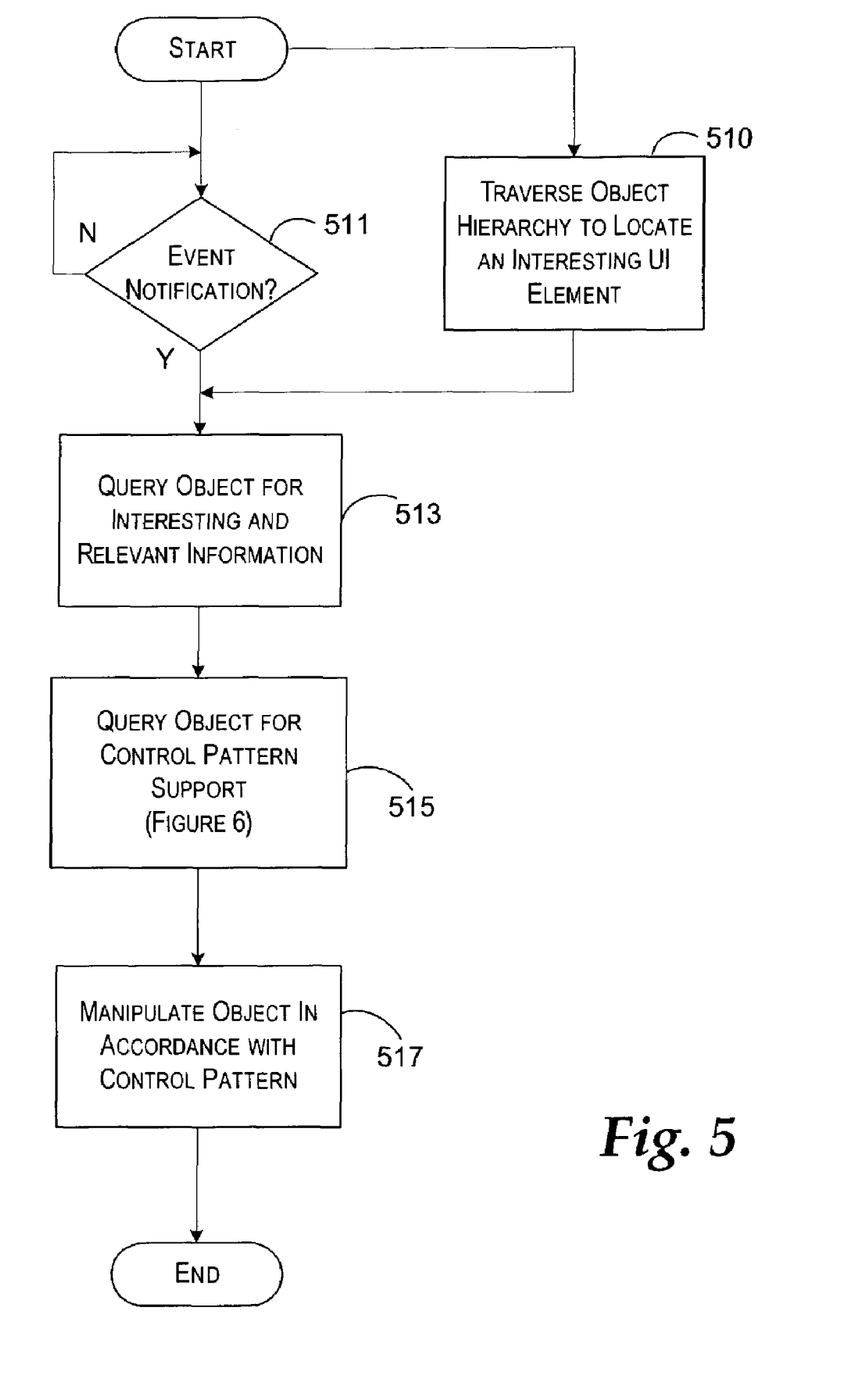
FIG. 5 is a logical flow diagram generally illustrating a process that may be employed by an assistive technology product to describe and manipulate screen elements for a user, in accordance with the invention.

FIG. 5 is a logical flow diagram generally illustrating a process that may be employed by an event-driven automation utility that relies on UI Automation events to discover screen elements to be interrogated for property information and manipulated using control patterns. The process begins by either traversing an object hierarchy to locate a particular element of interest (block 510), or it may idle in a loop (block 511) until it receives an event notification which it previously registered to receive. When an event notification is received, the process continues at block 513.

At block 513, the element of current interest is queried for a plurality of property information required by the user or the automation utility. In one implementation, an automation utility may retrieve from the current element properties that include human-readable strings intended for consumption by the user. The process continues at block 515.

At block 515, the element of interest is queried for control pattern support. One method of doing so is described below in conjunction with FIG. 6. Briefly stated, to determine how to programmatically manipulate the element, an automation utility may query whether the element supports a particular type of control pattern, or may query the element for the types of control patterns that it supports. Once the supported control patterns are known, the process continues at block 517.

At block 517, the element having focus is manipulated in accordance with its supported control patterns. For example, in response to a query (e.g., block 515) whether a particular control pattern is supported, the element may return an interface including methods that embody the behavior corresponding to the control pattern. Through the use of that interface, the automation utility (or any other client built on the UI Automation Framework and having the appropriate security permissions) may manipulate the element.

Figure 6:
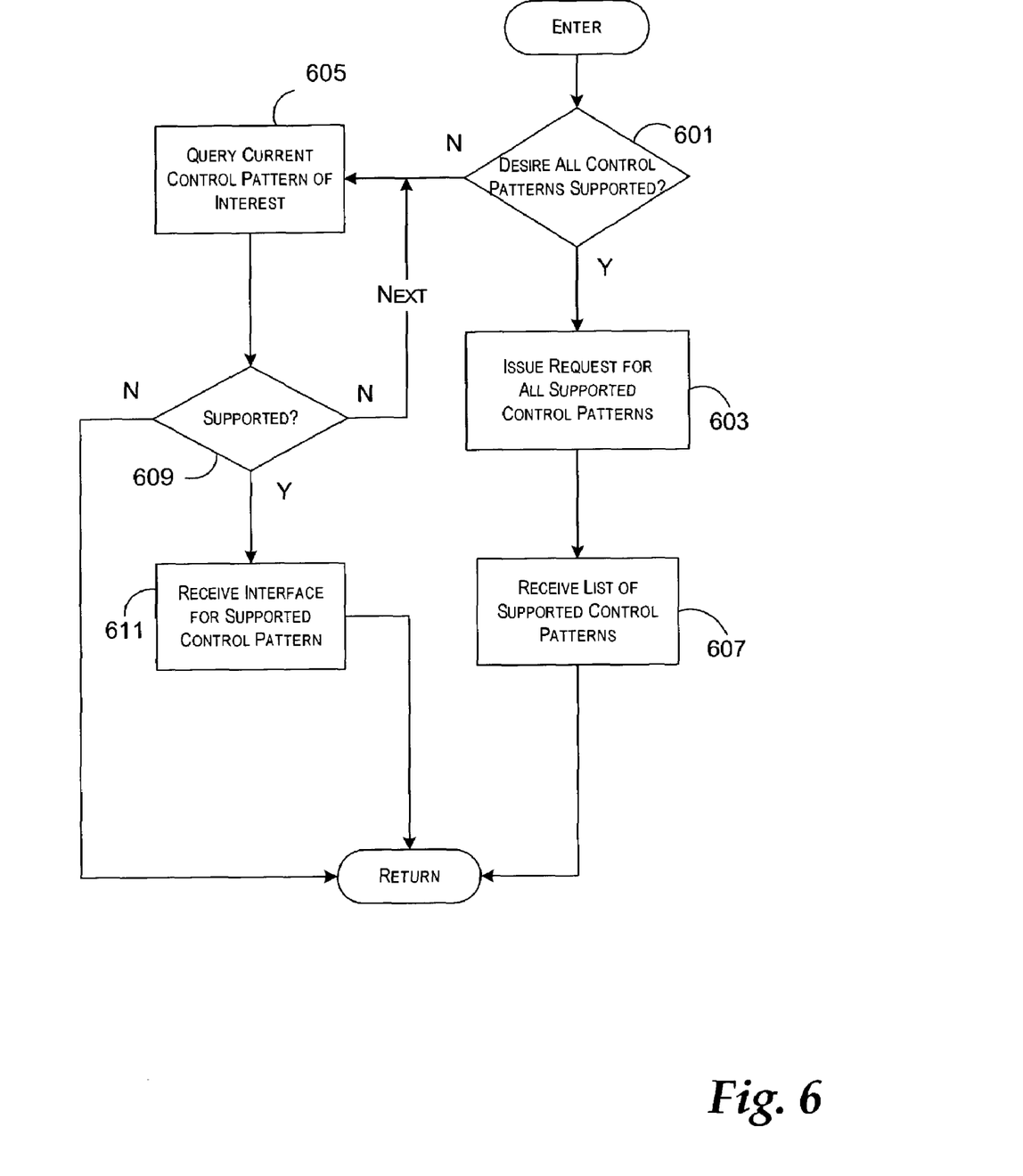
FIG. 6 is a logical flow diagram generally illustrating a process for querying an object to determine what behavior it exposes, in accordance with the invention.

FIG. 6 is a logical flow diagram generally illustrating a process for querying an object to determine what behavior it exposes. The process begins at decision block 601, where an element (represented by an object) has been discovered by an event notification or some other mechanism, such as traversing the UI Automation object hierarchy.

At decision block 601, a determination is made whether knowledge is desired about all the supported control patterns for the element with focus. For instance, some circumstances may warrant querying the element to determine all of its functionality rather than simply whether it behaves in a particular desired manner. One example of such an instance may be in a debugging or testing environment. In those cases, the process continues at block 603. However, more often than not, an automation utility needs to know whether the element supports a particular behavior. In those cases, the process continues at block 605.

At block 603, a query for the supported control patterns is issued to the element of interest. The query may request a complete list of the control patterns supported by the element. The query may request simply a list or it may request interfaces to each of the supported control patterns. In response, at block 607, the list is received and the requesting utility or application handles it in any appropriate way; however, a common usage is to then use the methods for the returned control pattern to programmatically manipulate the element (e.g., use the InvokePattern.Invoke( ) method to press the button 321 and thereby display the Help window).

At block 605, a query is issued to the element to determine if it supports a particular control pattern. In many cases, when facilitating the navigation of an application, an automation utility may know what functionality or behavior is expected at a particular point in the application. Accordingly, rather than requesting a list of all the supported control patterns, the automation utility may query whether an element supports a particular control pattern. Thus, at block 605, the automation utility may query an element whether it supports that particular control pattern.

At decision block 609, a determination is made whether the particular control pattern is supported. For instance, the element queried may simply return a failure if the requested control pattern is not supported. In that case, the AT utility may repeat the query at block 605 with another desired control pattern, or it may end if none of the desired control patterns are supported. If the current control pattern is supported, the process continues at block 611. The automation utility can query for support of specific control patterns until all control patterns of interest have been tried. It should be repeated that notice of support for a particular control pattern may be provided by simply returning to the calling automation utility an interface with the method(s) that correspond to the supported control pattern.

At block 611, the interface is received that includes the method(s) that enable the behavior associated with the control pattern. At this point, the automation utility may use the associated control pattern methods to manipulate the element in any appropriate way in accordance with the behavior of the control pattern. It will be appreciated that the disclosed system, components, and processes have enabled a mechanism by which user interface elements may be made known dynamically to a user and to an application, such as an automation utility, for programmatic manipulation.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for programmatically manipulating a user interface element, the method comprising:
   automatically determining from the element whether the element supports a control pattern by:
      receiving a query, from a screen reader automation utility, requesting a control pattern supported by the element;
      in response to receiving a query requesting a control pattern, determining a control pattern supported by the element, the element being of a particular element type, the control pattern describing basic functionality exposed by a plurality of types of elements that corresponds to methods supported by the element;
      returning an interface that includes the methods associated with the control pattern supported by the element to the screen reader automation utility;
   using the screen reader automation utility programmatically manipulate the element based on the control pattern without reference to the element's type by using at least one of the methods that enable functionality associated with the control pattern exposed by the element;
   requesting from the element a plurality of properties that can be used by the screen reader automation utility to gather information deemed to be important to a user, the plurality of properties including human-readable text that refers to an attribute of the element, wherein the attribute of the element comprises information about the element that, if conveyed to the user, informs the user about the element; and
   verbally conveying the information to the user.

2. The computer-implemented method of claim 1, wherein the basic functionality comprises one or more of predefined methods, structures, properties, or events.

3. The computer-implemented method of claim 1, wherein the element support a plurality of different control patterns.

4. The computer-implemented method of claim 1, wherein the screen reader describes functionality provided by the element based on the control panel.

5. The computer-implemented method of claim 1, wherein the basic functionality describes a behavior of the element and the functionality it provides to the user.

6. The computer-implemented method of claim 1, wherein the control pattern is at least one of a list comprising: ApplicationWindow, Calendar, Commands, DescriptiveInformation, Dock, ExpandCollapse, Graphic, Grid, GridItem, HierarchyItem, Invoke, Multimedia, MultipleView, RangeValue, Rotation, Scroll, Selection, SelectionItem, Sort, Split, Table, TableItem, Text, Value, VisualInformation, Window, Zoom.

7. A computer-readable medium having computer executable instructions for performing the method of claim 1.

8. A computer-readable medium having computer-executable components for manipulating an element, comprising:
   a screen reader automation utility configured to:
      transmit a query requesting a control pattern supported by an element of a different application, the element being a user interface element;
      receive a response from the different application, in response to the query, the response includes an interface in accordance with a control pattern that corresponds to a functional method supported by the element;
      programmatically manipulate the element based on the control pattern without reference to the element's type by using the functional method that enable functionality associated with the control pattern supported by the element;
      gather descriptive information about other elements of the user interface without requiring the screen reader automation utility to know a type of the element;
      request from the element a plurality of properties that can be used by the screen reader automation utility to gather information deemed to be important to a user, the plurality of properties including human-readable text that refers to an attribute of the element, wherein the attribute of the element comprises information about the element that, if conveyed to the user, informs the user about the element; and
      verbally conveying the information to the user.

9. The computer-readable medium of claim 8, wherein the control pattern comprises a means for describing the behavior of an element.

10. The computer-readable medium of claim 8, wherein the control pattern defines structure, properties, events, and methods supported by the element.

11. The computer-readable medium of claim 8, wherein the element supports a plurality of control patterns.

12. The computer-readable medium of claim 8, wherein the automation utility manipulates the element through an interface associated with the control pattern, the interface being returned by the element in response to the query whether the element supports the control pattern.

13. A computer-readable medium having computer-executable components for manipulating an element, comprising:
   receiving a query at the application including the element, the query requesting control patterns supported by the element from the screen reader automation utility;
   in response to receiving the query requesting control patterns, identifying one or more control patterns that are supported by the element, each control pattern describes a particular behavior of the element and associates methods supported by the element;
   returning an interface that includes methods associated with the one or more control patterns supported by the element to the screen reader automation utility;
   programmatically manipulating the element base on the one or more control patterns supported by the element without reference to the element's type by using the methods that enable behaviors associated with the control patterns supported by the element;
   requesting from the element a plurality of properties that can be used by the screen reader automation utility to identify information deemed to be important to a user, the properties including human-readable text that refers to an attribute of the element, wherein the attribute of the element comprises information about the element that, if conveyed to the user, informs the user about the element, and the properties being audibly conveyed to the user by the screen reader automation utility.

14. The computer-readable medium of claim 13, wherein each control pattern describes structure, properties, events, and methods supported by the element.

15. The computer-readable medium of claim 13, wherein the control pattern comprises a means for describing basic functionality of an element.

* * * * *